US011230229B2

(12) United States Patent
Iwazaki

(10) Patent No.: US 11,230,229 B2
(45) Date of Patent: Jan. 25, 2022

(54) STOWING DEVICE FOR VEHICLE

(71) Applicant: NIHON PLAST CO., LTD., Fujinomiya (JP)

(72) Inventor: Hidenori Iwazaki, Fujinomiya (JP)

(73) Assignee: NIHON PLAST CO., LTD., Fujinomiya (JP)

( * ) Notice: Subject to any disclaimer, the term of this patent is extended or adjusted under 35 U.S.C. 154(b) by 0 days.

(21) Appl. No.: 17/003,009

(22) Filed: Aug. 26, 2020

(65) Prior Publication Data

US 2021/0061178 A1    Mar. 4, 2021

(30) Foreign Application Priority Data

Aug. 27, 2019    (JP) .............................. JP2019-154775

(51) Int. Cl.
*B60R 7/04* (2006.01)
(52) U.S. Cl.
CPC ...................................... *B60R 7/04* (2013.01)
(58) Field of Classification Search
CPC ....................................................... B60R 7/04
USPC ........................... 296/37.8, 24.34, 37.1, 1.09
See application file for complete search history.

(56) References Cited

U.S. PATENT DOCUMENTS

| 7,766,407 | B2* | 8/2010 | Nakaya | E05C 19/022 |
| | | | | 296/24.34 |
| 10,066,425 | B2* | 9/2018 | Saikawa | B60R 7/04 |
| 10,160,360 | B2* | 12/2018 | Keller | B60N 2/793 |
| 10,533,351 | B2* | 1/2020 | Yano | E05B 83/32 |
| 2009/0066102 | A1* | 3/2009 | Shiono | B60R 7/04 |
| | | | | 296/24.34 |
| 2012/0319422 | A1* | 12/2012 | Kang | B65D 45/20 |
| | | | | 296/24.34 |

FOREIGN PATENT DOCUMENTS

JP    2013116646 A    6/2013

* cited by examiner

*Primary Examiner* — D Glenn Dayoan
*Assistant Examiner* — E Turner Hicks
(74) *Attorney, Agent, or Firm* — Procopio, Cory, Hargreaves & Savitch LLP

(57) ABSTRACT

A stowing device includes a stowing main body having a hole part at a side thereof, a side panel covering the side of the stowing main body, a lid including a hinge having a hinge hole thereof and partially positioned in a gap between the side of the stowing main body and the side panel, a bush inserted through the hole part and the hinge hole, and a temporary holding mechanism configured to temporarily hold the bush at a predetermined position with respect to the hole part. A sum of a protruding length of the bush at the predetermined position protruding from the hole part and a dimension obtained by subtracting a dimension of overlap between the hinge and the bush in a width direction from a maximum width of the part of the hinge positioned in the gap, is set to be less than a width of the gap.

5 Claims, 6 Drawing Sheets

STOWING DEVICE FOR VEHICLE

CROSS REFERENCE TO RELATED APPLICATION

This application is based upon and claims the benefit of priority from the prior Japanese Patent Application No. 2019-154775 (filing date: Aug. 27, 2019), the entire contents of which are incorporated herein by reference.

BACKGROUND

Technical Field

The present disclosure relates to a stowing device for a vehicle including a lid having a hinge a part of which is positioned in a gap between a stowing main body and a side panel.

Related Art

A console box, which is a stowing device for a vehicle and is disposed between a driver's seat and a passenger's seat or the like in an automobile, is known. The console box is provided with a stowing main body having an opening at an upper surface or the like, and a lid for opening and closing the opening of the stowing main body. The lid is connected to the stowing main body at a position of a hinge, and is configured so that the console box can be opened and closed (see JP 2013-116646 A, pages 4 to 8, and FIGS. 1 to 4).

SUMMARY

In recent years, there has been a demand for vehicle weight reduction. Accordingly, in order to reduce a weight of the console box, thickness of walls of the stowing main body may be reduced to suppress an amount of use of synthetic resin material.

When the thickness of the walls of the stowing main body is reduced, there may be no margin for setting a clip seat configured to receive a clip for mounting design panels covering sides of the stowing main body. In this case, a vibration welding may be adopted as a method of fixing the design panel to the stowing main body. However, since vibration welding may be hindered if a lid is mounted to the stowing main body in advance, the lid is mounted to the stowing main body after the design panels are vibration welded to the stowing main body.

When the lid is mounted to the stowing main body, the hinge of the lid and the stowing main body are connected by a bush having a screw hole therein and a screw. When the hinge of the lid is moved to a mounting position facing the bush after the bush is held in the stowing main body, it is necessary to elastically bend the hinge to avoid the end part of the bush protruding from the stowing main body.

However, since a width of the gap between the stowing main body and the design panel is limited, there may be a case where there is no sufficient margin for flexing the hinge.

A present disclosure provides a stowing device for vehicle capable of easily inserting a hinge of a lid into a gap between a side part of a stowing main body and a side panel.

A stowing device for a vehicle according to a present embodiment includes: a stowing main body having a hole part at a side part thereof; a side panel covering a part of the side part of the stowing main body, the part of the side part excluding at least the hole part; a lid including a hinge having a hinge hole of the hinge, the hinge hole configured to be aligned with the hole part, and a part of the hinge being positioned in a gap between the side part of the stowing main body and the side panel; a bush with cylindrical shape configured to be inserted through the hole part and the hinge hole; a mounting member attached to the bush and holding the hinge to the stowing main body; and a temporary holding mechanism configured to temporarily hold the bush at a predetermined position with respect to the hole part. A sum of a protruding length of an end part of the bush at the predetermined position protruding from the hole part and a dimension obtained by subtracting an dimension of overlap between the hinge and the end part of the bush in a width direction from a maximum width of the part of the hinge positioned in the gap, is set to be less than a width of the gap.

In the stowing device for the vehicle, the gap is formed to have a margin for the hinge of the lid to elastically bend in the width direction toward a side-panel side and configured to prevent interference of the hinge with the end part of the bush at the predetermined position or with the side part of the stowing main body. Accordingly, the hinge can be easily inserted into the gap between the side part of the stowing main body and the side panel.

The stowing device for the vehicle may have a coil spring urging the lid in a rotating direction to the stowing main body. In this case, the temporary holding mechanism may be formed of and end section of the coil spring.

When the stowing device for the vehicle has a coil spring and the temporary holding mechanism is formed of an end section of the coil spring, the bush can be temporarily held in a predetermined position by the end section of the coil spring, so that a dedicated component for temporarily holding the bush is not needed. Accordingly, the cost and weight of the stowing device can be reduced.

The temporary holding mechanism may be a bent part formed at the end section of the coil spring. The temporary holding mechanism may protrude inward of the stowing main body. The bush may include an engagement receiving part configured to engage with the temporary holding mechanism.

When the temporary holding mechanism is the bent part formed at the end section of the coil spring, the bent part protruding inward of the stowing main body engages with the engagement receiving part of the bush and temporarily hold the bush, so that the bush can be easily temporarily held by the bent part.

The end part of the bush may protrude from the hole part at the predetermined position temporarily held by the temporary holding mechanism. The hinge may have a groove thereof, the groove formed along a direction intersecting an axial direction of the bush and configured to receive the end part of the bush at the predetermined position.

When the end part of the bush protrudes from the hole part at the predetermined position temporarily held by the temporary holding mechanism, and the groove formed along a direction intersecting an axial direction of the bush and configured to receive the end part of the bush at the predetermined position, the hinge portion can be easily inserted into the gap by using the groove as a guide, that is, by inserting the end part of the bush protruding from the hole part into the groove and inserting the hinge into the gap along the groove. Further, the width dimension of the gap can be narrowed, since a width dimension of the gap can be narrowed by the depth dimension of the groove.

In the hinge part, the hinge hole may be formed at an end of the groove formed on the hinge.

When the hinge hole is formed at an end of the groove in the hinge, the hinge hole and the bush can be easily aligned only by inserting the hinge into the gap to a position where the end part of the bush abuts on the end of the groove, and the mounting member can be easily attached to the bush from the hinge hole.

DETAILED DESCRIPTION

Various embodiments will be described hereinafter with reference to the accompanying drawings.

The configuration of an embodiment will be described below with reference to the drawings.

Figure 6:
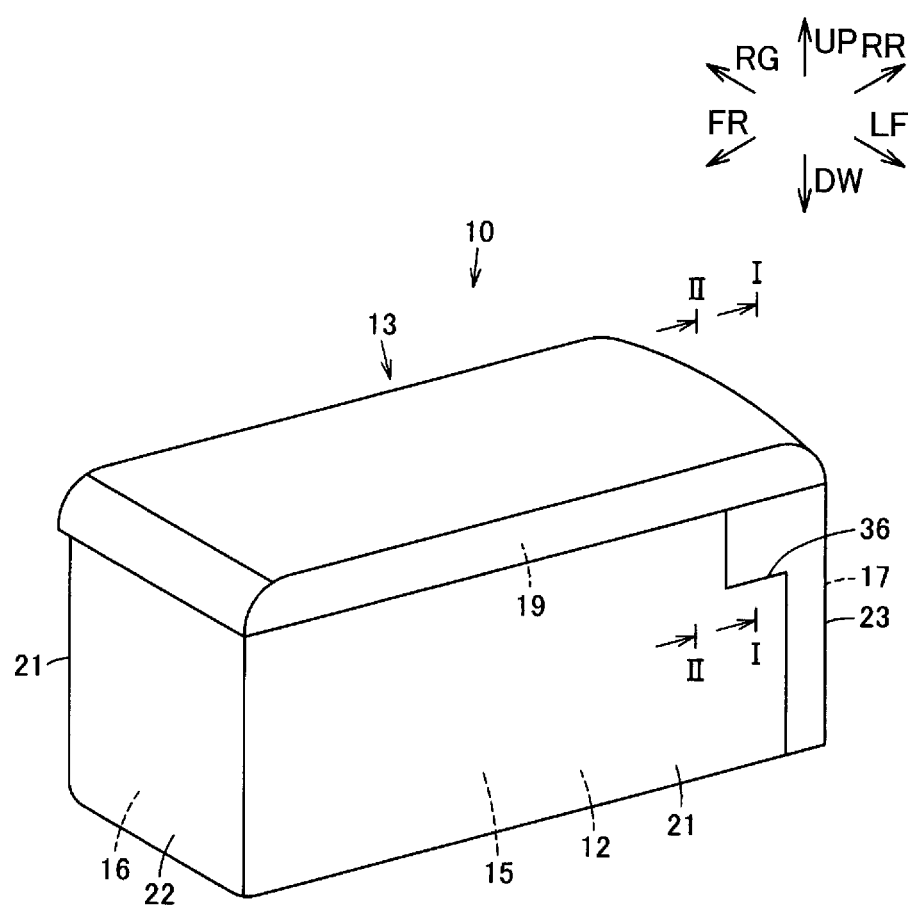
FIG. 6 is a perspective view of the stowing device for the vehicle according to the present embodiment.

FIG. 6 illustrates a console box 10, which is a stowing device for a vehicle. The console box 10 is a part of a center console positioned between front seats of a vehicle of an automobile namely a driver seat and a passenger seat, for example. For convenience of explanation, one predetermined direction is defined as a front-rear direction based on a state in which the console box 10 is mounted to a body of the vehicle, a predetermined direction orthogonal to the front-rear direction is defined as a left-right direction, and a direction orthogonal to the front-rear direction and the left-right direction is defined as an up-down direction. In FIG. 6, the forward direction FR, the backward direction RR, the left direction LF, the right direction RG, the upward direction UP, and the downward direction DW are illustrated.

The console box 10 is provided with a stowing main body 12 mounted on the vehicle body of an automobile and a lid 13 mounted on the stowing main body 12.

The stowing main body 12 is formed of synthetic resin in a box shape. The stowing main body 12 includes side surfaces 15 positioned on the left and right sides, a front-end surface 16 at a front end, and a rear-end surface 17 positioned at a rear end. The side surfaces 15 on the left and right are opposed to each other while being separated from each other. The front-end surface 16 and the rear end surface 17 are separated from each other and opposed to each other, and are each connected to the side surfaces 15 on the left and right. That is, the stowing main body 12 is formed in a rectangular cylindrical shape. The stowing main body 12 has a bottom surface (not illustrated). Inside the stowing main body 12, a stowage space for stowing an object to be stowed is partitioned by the left and right side surfaces 15, the front-end surface 16, the rear end surface 17, and a bottom surface. Each the left and right side surfaces 15, the front end surface 16, the rear end surface 17, and the bottom surface are formed to be thin, contribute to weight reduction of the console box 10 and the stowing main body 12. The left and right side surfaces 15 and the front-end surface 16, and the rear end surface 17 are appropriately formed with reinforcing ribs. The stowing main body 12 has an opening 19 at its upper end. The opening 19 is surrounded by left and right side surfaces 15 and the front-end surface and the rear end surface 17. The opening 19 communicates with the stowage space to allow access to the stowage space.

Each side surface 15, the front end surface 16, and the rear end surface 17 of the stowing main body 12 are covered with a side panel 21 on each side, a front panel 22, and a rear panel 23, respectively. The side panels 21, the front panel 22, and the rear panel 23 are design panels constituting a design surface of the console box 10. The side panels 21, the front panel 22 and the rear panel 23 are formed of synthetic resin, respectively. In the present embodiment, each of the side panels 21 is welded and fixed to respective side surface 15 by vibration welding or the like, and the rear panel 23 is attached and fixed to the rear end surface 17 by a fixing member such as a clip. The front panel 22 may be welded and fixed to the front end surface 16 by vibration welding or the like, or may be attached and fixed by a fixing member such as a clip.

Figure 1:
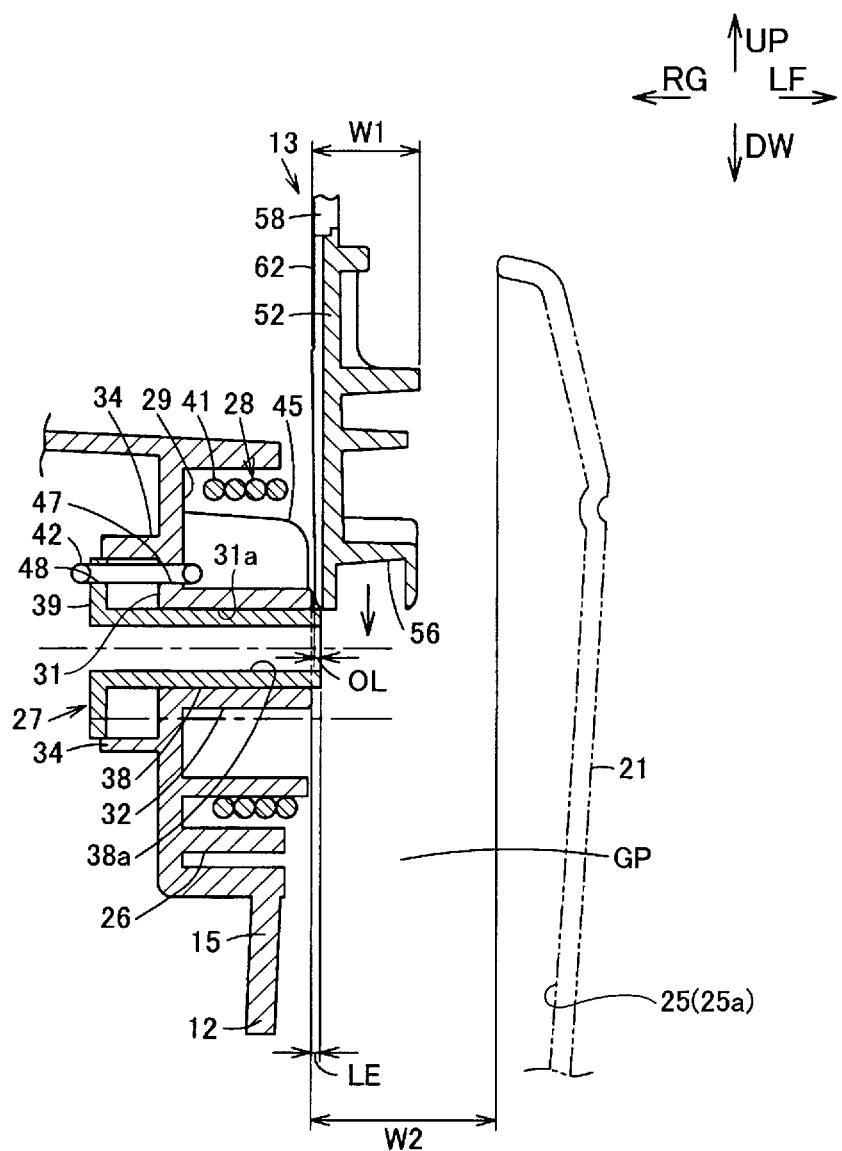
FIG. 1 is an end view illustrating a part of a process of mounting a lid to a stowing main body of a stowing device for a vehicle according to present embodiment.
Figure 4A:
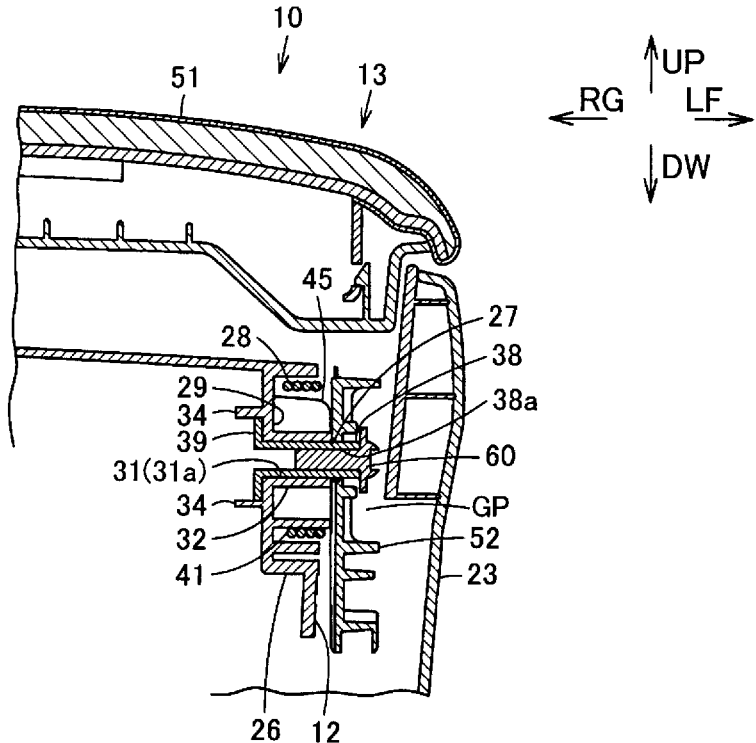
FIG. 4A is an end view of the stowing device for vehicle of the present embodiment at the position IVA-IVA in FIG. 6.
Figure 4B:
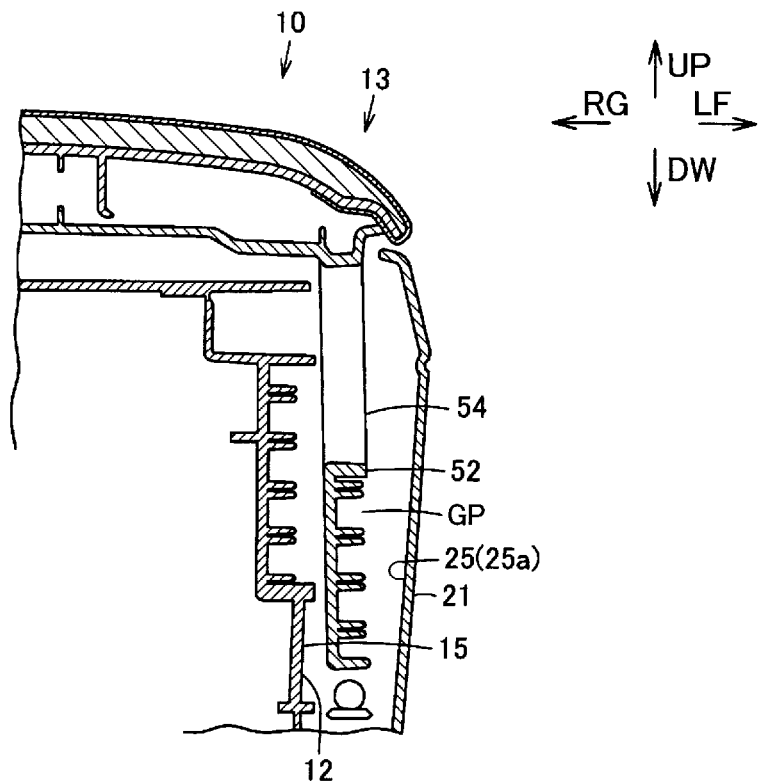
FIG. 4B is an end view of the stowing device for vehicle of the present embodiment at the position IVB-IVB of FIG. 6.

Each of the side panels 21 includes a welded part integrally welded to the side surface 15, and an opposed part 25 apart from and opposed to the side surface 15 via a gap GP, as illustrated in FIG. 4B. The opposed part 25 includes a hinge-opposing part 25a opposed to a hinge 52 of the lid 13. That is, a part of the hinge 52 is located in the gap GP between the hinge-opposing part 25a of the side panel 21 and the side surface 15 of the stowing main body 12. The gap GP in a vehicle width direction into which the hinge 52 is inserted is formed between the hinge-opposing part 25a and the stowing main body 12. As illustrated in FIG. 1, a width W2 of the gap GP is defined as a shortest distance in the left-right direction between the hinge-opposing part 25a of the side panel 21 and the side surface 15 of the stowing main body 12 when viewed in the front-rear direction. In other words, a distance between the positions that protrude most toward each other in the left-right direction.

Figure 5:
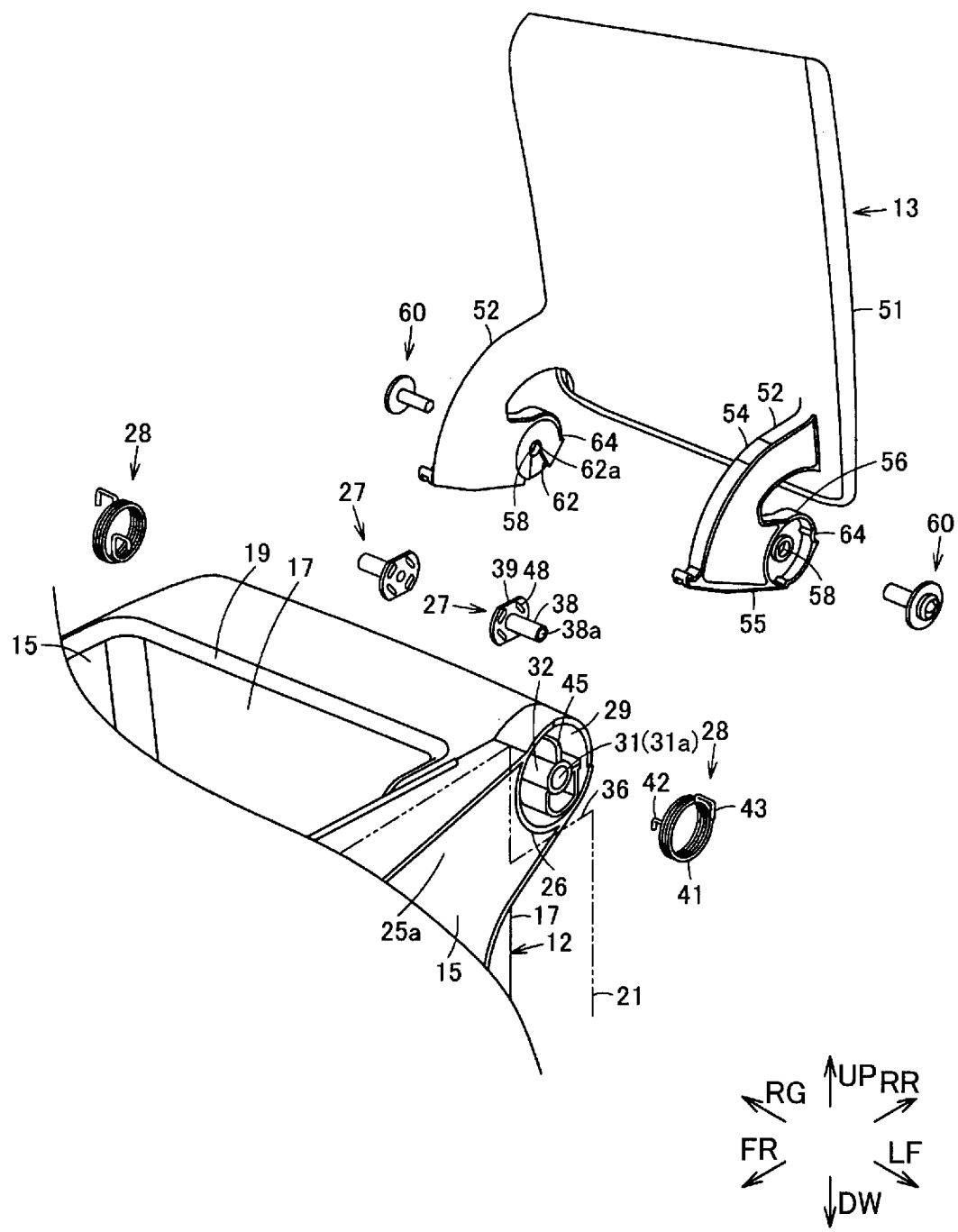
FIG. 5 is an exploded perspective view of a part of the stowing device for vehicle according to the present embodiment.

As illustrated in FIG. 5, each side surface 15 of the stowing main body 12 has a mounting portion 26. At the mounting portion 26, a bush 27 for supporting the lid 13 on the stowing main body 12 is attached. In the present embodiment, at the mounting portion 26, a coil spring 28 as an urging component urging the lid 13 to the stowing main body 12 is attached.

The mounting portions 26 are disposed on both left and right sides at the rear portion of the stowing main body 12. The mounting portion 26 is formed on the rear side of the opening 19. That is, the mounting portion 26 is formed on the upper side of the rear portion of each side surface 15 of the stowing main body 12. The mounting portion 26 is formed in a cylindrical shape having an axial direction along the left-right direction which is the vehicle width direction. In the present embodiment, as illustrated in FIGS. 4A and 5 which is a cross section perpendicular to the front-rear direction, the mounting portion 26 includes a recessed section 29 recessed inward at the side surface 15, that is, recessed toward a side of the stowage space in the left-right direction. The sectional shape of the recessed section 29 is formed in a crank shape. The recessed section 29 is formed by a cylindrical inner wall surface and a bottom surface of the mounting portion 26.

In the mounting portion 26, a hole part 31 configured to insert the bush 27 is disposed at a center. Specifically, the hole part 31 is arranged in the recessed section 29. The hole part 31 is a part serving as a center of rotation of the lid 13 with respect to the stowing main body 12. The hole part 31 includes a through hole 31a penetrating the side surface 15 of the stowing main body 12 in the vehicle width direction. The through hole 31a of the hole part 31 is a round hole. In the present embodiment, the hole part 31 further includes a holding shaft 32 as a bush holding component configured to hold the bush 27. The holding shaft 32 is formed in a cylindrical shape. That is, the hole part 31 has a through hole 31a therein penetrating at the side surface 15 through the holding shaft 32. The holding shaft 32 is formed to protrude outward from the side surface 15. In this embodiment, as illustrated in FIG. 1, a tip of the holding shaft 32 slightly protrudes outward from the recessed section 29. That is, the holding shaft 32 protrudes most toward the side panel 21 in the mounting portion 26. However, the tip of the holding shaft 32 may be located inside the recessed section 29.

In this embodiment, the hole part 31 further includes a restriction part 34 protruding inward from the side surface 15. The restriction part 34 restricts a position of the bush 27 with respect to the hole part 31. The restriction part 34 protrudes on the side surface 15 to a side opposite to the holding shaft 32. The restriction part 34 is formed in a rib shape protrudes from the side face 15. The restriction part 34 is formed on one side and the other side with respect to the through hole 31a of the hole part 31. Specifically, as illustrated in FIG. 1 to 4A, the restriction part 34 is formed on the upper side and the lower side of the through hole 31a.

As illustrated in FIG. 5, at least the through hole 31a of the hole part 31 and the holding shaft 32 of the mounting portion 26 is located so as not to be covered by the side panel 21 in the left-right direction. In this embodiment, the mounting portion 26 is positioned facing the cutout 36 formed in the side panel 21. In the present embodiment, as illustrated in FIGS. 4A and 6, the part of the mounting portion 26 facing the cutout 36 of the side panel 21 is configured to be covered with the rear panel 23 covering the rear end surface 17 of the stowing main body 12. As illustrated in FIG. 4A, a gap GP is also formed at a position between the mounting portion 26 facing the cutout 36, at least a part including the through hole 31a and the holding shaft 32, and the rear panel 23 attached to the stowing main body 12.

The bush 27 illustrated in FIG. 5 is made of metal, for example. The bush 27 includes a body part 38 configured to insert into the through hole 31a of the hole part 31. The body part 38 is formed in a cylindrical shape. The body part 38 is inserted through the holding shaft 32. The bush 27 has a flange 39 arranged on the inner surface side of the side surface 15 with respect to the hole part 31. The flange 39 protrudes to an outer side in a radial direction of the body part 38 from the base end of the body part 38. A shape of the flange 39 is rotationally asymmetric. In this embodiment, the shape of the flange 39 is long in one direction and short in the orthogonal direction to the one direction. A short side of flange 39 is configured to be held between the restriction parts 34.

The coil spring 28 is a component imparts an urging force to the lid 13 in the rotating direction. In the present embodiment, the coil spring 28 imparts the urging force to the lid 13 when the lid 13 is opened. The coil spring 28 is made of metal, for example. The coil spring 28 is provided with a spring body 41 in which a wire is spirally wound, and arm parts 42, 43 extending out from both ends of the spring body 41 along an axial direction of the spring body. The coil spring 28 is held at the mounting portion 26 by a holding part 45 formed in the mounting portion 26. The holding part 45 is formed in a rib shape at a position around the holding shaft 32. The holding part 45 is pressed against the inner periphery of the spring body 41 at least toward the radial direction. Therefore, the coil spring 28 is disposed around the through hole 31a and the holding shall 32 in the hole part 31.

The spring body 41 is positioned inside the recessed section 29. That is, the spring body 41 is positioned on the outer surface side of the stowing main body 12.

Figure 3:
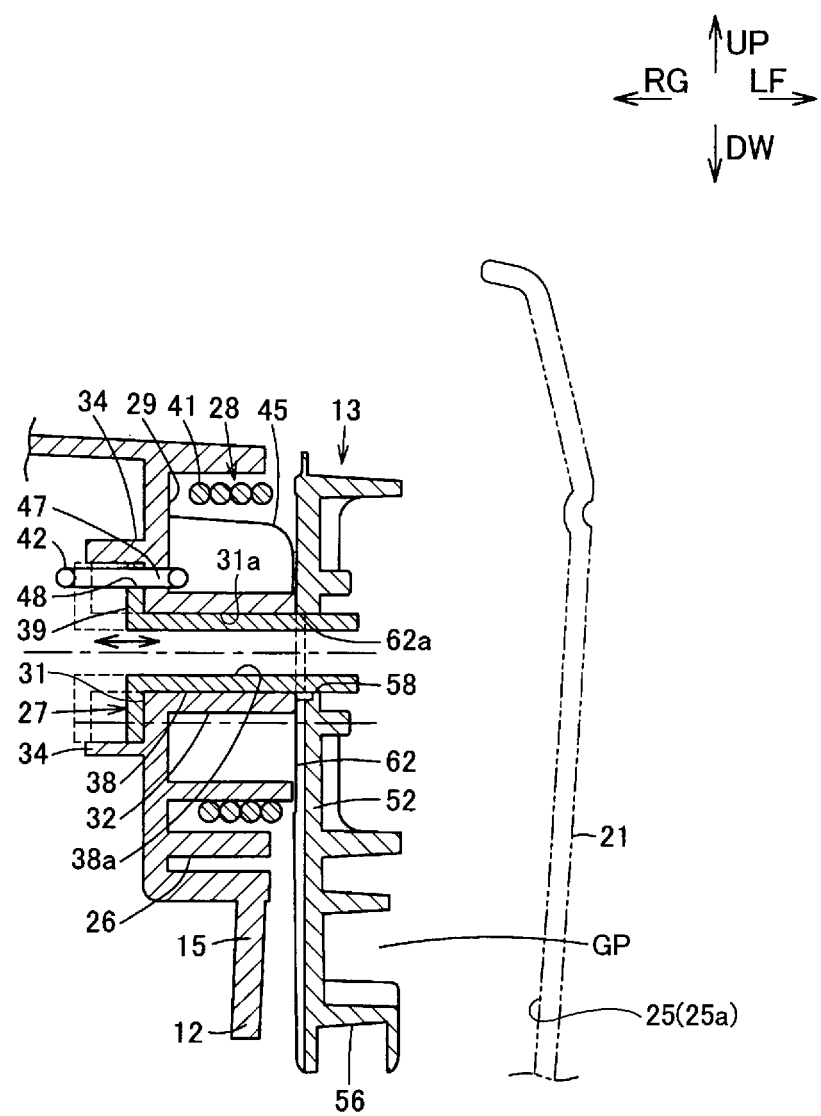
FIG. 3 is an end view illustrating a part of a process following the process illustrated in FIG. 2 for mounting the lid to the stowing main body of the stowing device for vehicle of the present embodiment.

The arms 42, 43 are end sections of the coil spring 28. The arms 42, 43 each includes bent part bent at least in an L-shape. In the present embodiment, the arms 42, 43 each includes bent part bent in an angular U-shape. The arm 42 is a fixed-side arm held on the stowing main body 12 side. In this embodiment, the arm 42 is held together with the bush 27 on the stowing main body 12 side. As illustrated in FIG. 1 and the like, the arm 42 is at the mounting portion 26 and protrudes to inward of the stowing main body 12 from an opening 47 formed on the side surface 15 of the stowing main body 12. In the present embodiment, as illustrated in FIG. 1, the arm 42 works as a temporary holding mechanism configured to temporarily hold the bush 27 relative to the hole part 31 at a first predetermined position in the axial direction of the hole part 31 or the bush 27. That is, the arm 42 temporarily holds the bush 27 in the first predetermined position when mounting the lid 13 onto the stowing main body 12. In the bush 27 temporarily held in the first predetermined position, the body part 38 is inserted into the through hole 31a of the hole part 31, and the flange 39 is positioned apart from the side surface 15. In the present embodiment, the arm 42 is a holding mechanism configured to hold the bush 27 in a state where the lid 13 is mounted to the stowing main body 12. That is, the arm 42 holds the bush 27 within the hole part 31 at a second predetermined position in the axial direction of the hole part 31 or the bush 27 which is a different position from the first predetermined position, when the lid 13 is mounted to the stowing main body 12. As illustrated in FIG. 3, the bush 27 is movable from the first predetermined position to the second predetermined position while being held by the arm portion 42. In the bush 27 held at the second predetermined position, the body part 38 is inserted into the through hole 31a of the hole part 31, and the flange 39 is in contact with the side surface 15 from the inner surface side of the stowing main body 12 in the left-right direction. That is, in the axial direction of the hole part 31 or the bush 27, the second predetermined position is the position on the outward direction relative to the first predetermined position of the stowing main body 12.

The arm 42 is engaged with an engagement receiving part 48 of the bush 27. The engagement receiving part 48 includes a hole formed in the flange 39. The engagement receiving part 48 is engaged with the arm 42 protruding inward of the stowing main body 12 from the opening 47 formed on the side surface.

As illustrated in FIG. 5, the arm 43 is a rotation-side arm held on the lid 13 side. The arm 43 engage with a hinge engaging part 64 formed on the hinge 52 of the lid 13.

The lid 13 is supported on the stowing main body 12 and configured to open and close the opening 19 of the stowing main body 12. The lid 13 may also function as an armrest on which an occupant puts ones elbow or the like when the opening 19 is in a closed state. The lid 13 includes a lid body 51 movable with respect to the stowing main body 12, and the hinge 52 on the lid body 51 supporting the lid 13 onto the stowing main body 12. The lid body 51 of the lid 13 is rotatably supported to the stowing main body 12 via the hinge 52. The lid 13 includes a latch holding part (not illustrated) which is held by the latch part (not illustrated) of the stowing main body 12 at a position where the opening 19 is closed. The latch holding part can be released from a latched state by the operation to the latch part of an occupant.

The lid body 51 is positioned above the console box 10. The lid body 51 is made of synthetic resin. The lid body 51 may have any shape as long as the lid body 51 can cover the opening 19. In this embodiment, the lid body 51 is formed in a longitudinal rectangular shape in the front-rear direction. At least the outer surface of the lid body 51 may be covered with a skin body such as leather or cloth.

As illustrated in FIGS. 1 to 5, the hinge 52 is a supported part rotatably supported on the mounting portion 26 of the stowing main body 12. The hinge 52 is made of synthetic resin, for example. In the present embodiment, a pair of the hinges 52 is arranged on the lid body 51, each hinge 52 being apart from each other in the short side of the lid body 51, that is, in the vehicle width direction when mounted to the vehicle. Further, in the present embodiment, the hinge 52 is disposed at one end in the longitudinal direction of the lid body 51, that is, an end closer to the rear side. The hinge 52 is arranged between the side surface 15 of the stowing main body 12 and the side panels 21 or between the side surface 15 and the rear panel 23 at least in a state where the opening 19 of the stowing main body 12 is closed by the lid 13, and one side of the hinge 52 is covered by the side panel 21 and the rear panel 23. That is, when the lid 13 is mounted on the stowing main body 12, a part on the inner side of the hinge 52 is opposed to the side surface 15 of the stowing main body 12, and a part on the outer side of the hinge 52 is opposed to the hinge opposing part 25a of the side panel 21. A part of the hinge 52 is positioned in the gap GP between the side face 15 and the side panel 21. Therefore, the hinge 52 is not exposed to the outside of the console box 10 in a state that the opening part 19 is closed by the lid body 51.

The hinge 52 includes a hinge base 54 protruding from the lid body 51 and a hinge support section 55 continued to a tip part of the hinge base 54, integrally formed as a single member. The hinge base 54 is a part positioned basically between the side surface 15 of the stowing main body 12 and the side panel 21 or between the side surface 15 and the rear panel 23, in a state where the opening 19 is closed by the lid body 51. Further, the hinge base 54 is a part configured to expose above the opening 19 when the opening 19 is opened by rotating the lid 13. In the present embodiment, the hinge base 54 is formed to be curved in an arc shape when viewed from the vehicle width direction with respect to the lid body 51. The hinge support section 55 is basically a section located between the side surface 15 of the stowing main body 12 and the side panel 21 or between the side surface 15 and the rear panel 23, in both the open and closed states of the opening 19. The hinge support section 55 extends backward from the tip part of the hinge base 54 and form a bent shape with the hinge base 54. The base end of the hinge support section 55 is located in the gap GP between the side surface 15 and the side panel 21, with the inside facing the side surface 15 of the stowing main body 12 and the outside facing the hinge-opposing part 25a of the side panel 21. The base end of the hinge support section 55 is a section where the hinge support section 55 continues to the tip part of the hinge base 54. On the hinge support section 55, a hinge mounting section 56 configured to support the hinge 52 onto the stowing main body 12 is formed. In this embodiment, the hinge mounting section 56 is disposed at a tip part of the hinge support section 55. The hinge mounting section 56 is positioned on the rear side of the base end of the hinge base 54 in the front-rear direction. The base end of the hinge base 54 is a part where the hinge base 54 continues to the lid body 51. The hinge mounting section 56 is aligned with the mounting portion 26 of the stowing main body 12 and superposed on the mounting portion 26 from the outside. The hinge mounting section 56 is formed in a cylindrical shape having an axial direction along a left-right direction as a vehicle width direction. In the present embodiment, the hinge mounting section 56 includes a recessed portion recessed toward an inner side direction, that is, in the left-right direction, on the stowage space side in the hinge support section 55. At this time, the sectional shape of the recessed part of the hinge mounting section 56 is formed in a crank shape.

In the hinge mounting section 56, a hinge hole 58 configured to insert the bush 27 is formed at a center part of the hinge mounting section 56. The hinge hole 58 is aligned coaxially with the through hole 31a of the hole part 31 of the stowing main body 12, and serves as the center of rotation of the lid 13 relative to the stowing main body 12. The hinge hole 58 penetrates the hinge mounting section 56 in the vehicle width direction. The hinge hole 58 is a round hole. The hinge hole 58 has a diameter larger than that of the through hole 31a of the hole part 31 of the stowing main body 12. The hinge hole 58 is arranged to face the cutout 36 formed in the side panel 21 and covered with the rear panel 23. A mounting screw 60 serving as a mounting member is attached to the bush 27 in a state where the bush 27 is inserted through the hinge hole 31 and the through hole 31a of the hole part 31. The mounting screw 60 is screwed to the bush 27 and holds the hinge 52 with the bush 27. That is, in the bush 27, a screw receiving part 38a configured to receive the mounting screw 60 is formed in the body part 38.

Figure 2:
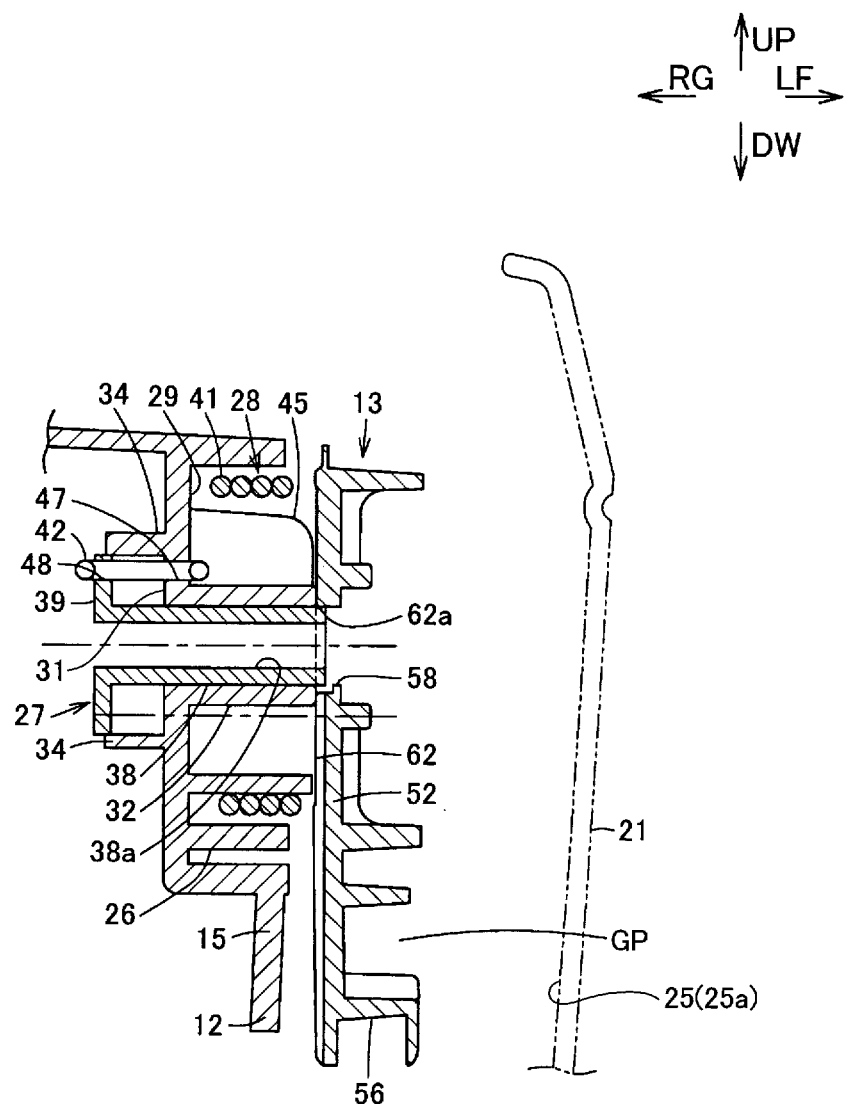
FIG. 2 is an end view illustrating a part of a process following the process illustrated in FIG. 1 in the work of mounting the lid to the stowing main body of the stowing device for vehicle according to the present embodiment.

Further, in the present embodiment, the hinge 52 has a groove 62 formed thereon. The groove 62 is configured to receive an end part of the bush 27 when temporarily held at the first predetermined position by the arm 42 of the coil spring 28 and inserted into the groove 62. That is, as illustrated in FIGS. 1 and 2, in a cross section perpendicular to the front-rear direction, the end part of the bush 27 temporarily held in the first predetermined position overlaps the hinge 52 in the width direction by a length inserted into the groove 62. The groove 62 is formed along a direction intersecting the axial direction of the bush 27. In this embodiment, the groove 62 is formed at the hinge mounting section 56 on a side facing the side surface 15 of the stowing main body 12. The groove 62 is continuous along the insertion direction of the hinge 52 into the gap GP between the side face 15 of the stowing main body 12 and the side panel 21. In this embodiment, the hinge 52 is inserted in the vertical direction. A lower end of the groove 62 is opened to a lower end of the hinge 52. The hinge hole 58 is located at an upper end of the groove 62. That is, a wall 62a is formed at the upper end of the groove 62, and the wall 62a is continuous with the inner peripheral surface of the hinge hole 58. The wall 62a sets an insertion limit of the hinge 52 into the gap GP. Further, as illustrated in FIG. 5, the groove 62 is formed so as to gradually expand from the hinge hole 58 side toward the opened lower end. That is, the groove 62 is formed so as to gradually narrow from the lower end toward the upper end.

In the present embodiment, as illustrated in FIG. 1, a sum of a protruding length LE, the protruding length LE being a length of an end part of the bush 27 protruding from the holding shaft 32 when the bush 27 is temporarily held by the arm 42 of the coil spring 28 at the first predetermined position, and a dimension (W1-OL) obtained by subtracting an overlapped dimension OL, the overlapped dimension OL being a dimension of the end of the bush 27 overlapping with the hinge 52 in the width direction, from a maximum width W1 of a part of the hinge 52 located in the gap GP is set to be less than the width dimension W2 of the gap GP. That is, when the protrusion length of the end part of the bush 27 at the first predetermined position from the hole part 31 (holding shaft 32) is denoted by LE, the maximum width of the hinge 52 located in the gap GP is denoted by W1, the overlapped dimension of the hinge 52 and the end part of the bush 27 is denoted by OL, and the width dimension of the gap GP is denoted by W2, a relationship (LE+W1-OL)<W2 is satisfied. The protrusion length LE and the overlapped dimension OL may include 0. The maximum width W1 of the hinge 52 located in the gap GP is a maximum width of the hinge 52 at a part opposing the opposed part 25 of the side panel 21 (or the hinge-opposing part 25a). That is, the hinge 52 may have a width larger than the maximum width W1 at a portions not located in the gap GP.

The hinge mounting section 56 is formed with a hinge engaging part 64 configured to engage the arm 43 of the coil spring 28. The hinge engaging part 64 is formed on the outer edge of the hinge mounting section.

As illustrated in FIG. 6, when assembling the console box 10, first, separately formed side panels 21 are integrally welded on both side surfaces 15 of the stowing main body 12 formed in advance by vibration welding or the like. As illustrated in FIG. 5, at an upper-rear part of each side surface 15, the hole part 31 of the mounting portion 26, particularly a part including the holding shaft 32, is arranged facing the cutout 36 of each side panel 21. The other part of each side surface 15 is covered with the side panel 21. Further, as illustrated in FIG. 1~4A, at least at an area around the hole part 31, particularly an area including the holding shaft 32, of each side surface 15 is opposed via the gap GP to a hinge opposing part of the rear panel 23 or a virtual line of the side panel 21 (see long dashed double-dotted lines denoted as "21" in FIGS. 1-3) extended to the cutout 36 part.

Next, the coil spring 28 is mounted around the holding part 45 of the mounting portion 26. A spring body 41 of the coil spring 28 is held on the holding part 45. The arm 42 of the coil spring 28 is inserted through the opening 47 formed on the side surface 15 of the stowing main body 12 and is engaged with the engagement receiving part 48 of the bush 27. The body part 38 of the bush 27 is inserted into the through hole 31a of the hole part 31 from an inner side of the stowing main body 12 through the holding shaft 32, and the flange 39 is set between the restriction part 34. In this state, the bush 27 is temporarily held in the first predetermined position and the end part of the body part 38 of the bush 27 slightly protrudes from the holding shaft 32 or is positioned in the holding shaft 32. In this embodiment, the end part of the body part 38 of the bush 27 slightly protrudes from the holding shaft 32. That is, although the bush 27 is a member to be inserted through the hole part 31 of the stowing main body 12 and the hinge hole 58 in the hinge 52 of the lid 13, the bush 27 is temporarily held at the first predetermined position before mounting the lid 13 to the stowing main body 12. This configuration, the bush 27 being held at the first predetermined position, reduces an amount of protrusion of the bush 27 from the hole part 31 (or the holding shaft 32) and makes it possible not to prevent an insertion of the hinge 52 of the lid 13 into the gap GP.

Further, as illustrated in FIG. 2, the lid 13 to be separately formed is employed and the hinge 52 of the lid 13 is inserted into the gap GP. The hinge 52 is slid along the groove 62 while inserting the end part of the bush 27 to the opening of the groove 62. The hinge 52 may be slightly elastically bent outwardly, i.e., toward the side panel 21, so as to prevent interference between the end part of the bush 21 and the inner surface of the hinge 52, as required.

The end part of the bush 27 inserted to the groove 62 is brought into contact with the wall 62a at the end of the groove 62 by inserting the hinge 52 into the gap GP. Thus, the hinge 52 is positioned with respect to the stowing main body 12. That is, the wall 62a acts as a stopper for positioning the hinge 52, and the hinge 52 is positioned at a position where the bush 27 and the hinge hole 58 of the hinge 52 are coaxial.

As illustrated in FIG. 3, by sliding the bush 27 from the first predetermined position to the second predetermined position, the body portion 38 of the bush 27 is inserted through the through hole 31a of the hole part 31 and through the hinge hole 58 of the hinge 52. Thereafter, as illustrated in FIG. 4A, the mounting screw 60 is screwed into the screw receiving part 38a of the bush 27 facing the cutout 36 of the side panel 21, whereby the hinge 52 is connected to the side part of the stowing main body 12. Further, assembling of the console box 10 is completed by attaching the rear panel 23 onto the rear end surface 17 and covering the rear end surface 17 and the cutout 36 part of the side panel 21 with the rear panel 23. If the front panel 22 is configured to be fixed to the front end surface 16 of the stowing main body 12 by vibration welding or the like, the front panel 22 may be welded to the front end surface 16 when the side panel 21 is welded to the side surface 15, and if the front panel 21 is configured to be fixed to the front end surface 16 of the stowing main body 12 by a fixing member, the front panel 22 may be attached to the front end surface 16 when the rear panel 23 is attached to the rear end surface 17.

According to the present embodiment, the sum of the protruding length LE, the protruding length LE being a length of the end part of the bush 27 protruding from the hole part 31 when the bush 27 is temporarily held by the arm 42 of the coil spring 28 at the first predetermined position, and the dimension (W1-OL) obtained by subtracting the overlapped dimension OL being a dimension W2 of the end part of the bush 27 overlapping with the hinge 27 in the width direction, from the maximum width W1 of a part of the hinge 52 located in the gap GP is set to be less than the width dimension W2 of the gap GP. Therefore, a margin for the hinge 52 to elastically bend in the width direction toward the side panel 21 side and to prevent interference of the hinge 52 with the end part of the bush 27 at the first predetermined position or with the side surface 15 side of the stowing main body 12, is secured in the gap GP. Due to this configuration, the hinge 52 of the lid 13 can be easily inserted into the gap GP between the side surface 15 of the stowing main body 12 and the side panel 21, and mutual damage due to interference between the hinge 52 and the side surface 15 and/or interference between the hinge 52 and the opposed part 25 of the side panel 21 can be prevented.

That is, according to the present embodiment, the lid 13 can be mounted to the stowing main body 12 of the console box 10 within a limited layout.

The side panel 21 can be welded to the side surface 15 of the stowing main body 12 by vibration welding or the like before the lid 13 is mounted to the stowing main body 12. Therefore, as compared with the case where the side panel 21 is fixed to the side surface 15 of the stowing main body 12 by using a fixing member, such as clips or the like, the receiving seat of the fixing member is not required, and the side surface 15 can be formed thin. That is, the weight of the console box 10 can be reduced, and the weight of the vehicle mounted with the console box 10 can be reduced.

The bush 27 is temporarily held at the first predetermined position by the arm 42 positioned at the end section of the coil spring 28. Therefore, according to the present embodiment, an additional dedicated component for temporarily holding the bush 27 is not necessary, and the cost and weight can be reduced.

The arm 42 being in bent-shaped formed at the end section of the coil spring 28 is configured to protrude inward of the stowing main body 12 and engaged with the engagement receiving part 48 of the bush 27 and temporarily held by the bush 27. Therefore, the bent shape of the arm 42 allows the bush 27 to be temporarily held easily by the arm 42.

A groove 62 configured to insert the end part of the bush 27 at the first predetermined position is formed on the hinge 52 along a direction intersecting the axial direction of the bush 27. Further, the end part of the bush 27 protruding from the holding shaft 32 of the hole part 31 is inserted into the groove 62 and allows the hinge 52 to be inserted into the gap GP along the groove 62. Therefore, the hinge 52 can be easily inserted into the gap GP by the groove 52 as a guide, and can narrow a width dimension of the gap GP by a dimension of the tip of the bush 27 inserted into the groove 62, that is, an overlapping dimension in the width dimension. Accordingly, the amount of deformation by elastically bending the hinge 52 when the hinge 52 is inserted into the gap GP can be reduced to substantially zero. Furthermore, the width dimension of the gap GP can be reduced. That is, the clearance between the hinge 52 and the side surface 15 and the clearance between the hinge 52 and the opposed part 25, including the hinge-opposing part 25a, of the side panel 21 can be reduced. Further, the external appearance of the console box 10 can be downsized while securing the stowage space in the console box 10.

In the present embodiment, the hinge hole 58 is located at one end of the groove 62. According to this configuration, the hinge hole 58 and the bush 27 can be easily aligned only by inserting the hinge 52 into the gap GP to a position where the end part of the bush 27 abuts on the wall 62a at the end of the groove 62. That is, the mounting screw 60 can be easily attached from the hinge hole 58 to the bush 27.

Further, since the groove 62 is gradually narrowed from the opening at the lower end toward the wall 62a at the upper end, insertion of the end part of the bush 27 into the groove 62 is facilitated by the wide opening of the groove 62 at the lower end, and sure alignment of the bush 27 with the hinge hole 58 is achieved by the gradually narrowed groove 62 narrowed toward the hinge hole 58.

In the present embodiment, the arm 42 of the coil spring 28 is employed as the temporary holding mechanism, but the present invention is not limited to this, and other members or structures may be employed as the temporary holding mechanism.

Although the console box 10 provided in the passenger compartment of the vehicle has been described in the present embodiment, the present invention is not limited to this configuration, and it can be applied to any other stowing device for a vehicle disposed in another position of the vehicle.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A stowing device for vehicle comprising:
   a stowing main body having a hole part at a side part thereof;
   a side panel covering a part of the side part of the stowing main body, the part of the side part excluding at least the hole part;
   a lid including a hinge having a hinge hole of the hinge, the hinge hole configured to be aligned with the hole part, and a part of the hinge being positioned in a gap between the side part of the stowing main body and the side panel;
   a bush with cylindrical shape configured to be inserted through the hole part and the hinge hole;
   a mounting member attached to the bush and holding the hinge to the stowing main body; and
   a temporary holding mechanism configured to temporarily hold the bush at a predetermined position with respect to the hole part, wherein
   a sum of a protruding length of an end part of the bush at the predetermined position protruding from the hole part and a dimension obtained by subtracting a dimension of overlap between the hinge and the end part of the bush in a width direction from a maximum width of the part of the hinge positioned in the gap, is set to be less than a width of the gap.

2. The stowing device for vehicle according to claim 1, the stowing device further comprising a coil spring urging the lid in a rotational direction to the stowing main body, wherein the temporary holding mechanism is formed of an end section of the coil spring.

3. The stowing device for vehicle according to claim 2, wherein the temporary holding mechanism is a bent part formed at the end section of the coil spring and protruding inward of the stowing main body, wherein the bush includes an engagement receiving part configured to engage with the temporary holding mechanism.

4. The stowing device for vehicle according to claim 1, wherein
   the bush has the end part protruding from the hole part at the predetermined position temporarily held by the temporary holding mechanism, and
   the hinge has a groove thereof, the groove formed along a direction intersecting an axial direction of the bush and configured to receive the end part of the bush at the predetermined position.

5. The stowing device for vehicle according to claim 4, wherein the hinge hole is formed at an end of the groove formed on the hinge.

* * * * *